United States Patent [19]
Anderson

[11] Patent Number: 5,582,431
[45] Date of Patent: Dec. 10, 1996

[54] RETRACTABLE MUD FLAP

[76] Inventor: Gene D. Anderson, 796 E. Birch St., Barron, Wis. 54812

[21] Appl. No.: 309,948

[22] Filed: Sep. 21, 1994

[51] Int. Cl.$^6$ ................................................. B62D 25/18
[52] U.S. Cl. ................................................. 280/851
[58] Field of Search ........................ 280/851, 848, 280/847; 137/354, 355; 60/484; 160/23.1

[56] References Cited

U.S. PATENT DOCUMENTS

| | | | |
|---|---|---|---|
| 3,507,513 | 4/1970 | Bohrer | 280/851 |
| 3,982,469 | 9/1976 | Bianchetta | 60/484 X |
| 4,124,221 | 11/1978 | Goings | 280/851 |
| 4,809,615 | 3/1989 | Brickett | 280/763.1 X |
| 4,916,764 | 4/1990 | Meaden et al. | 160/23.1 X |

*Primary Examiner*—Anne Marie Boehler
*Assistant Examiner*—Michael Mar
*Attorney, Agent, or Firm*—Ryan, Maki, Mann & Hohenfeldt

[57] ABSTRACT

A retractable mud flap assembly for a motor vehicle includes an enclosure having a forward end and a rearward end and a generally flat profile and being open at its rearward end. A mud flap of a flat flexible shape is positioned for retraction into the enclosure and extension therefrom. A linear actuator, which is preferably a double acting hydraulically or pneumatically actuated cylinder, is attached to the mud flap and adapted to apply force thereto to extend and retract them. Preferably a downwardly curved lip extends from the lowermost rear surface of the enclosure.

3 Claims, 2 Drawing Sheets

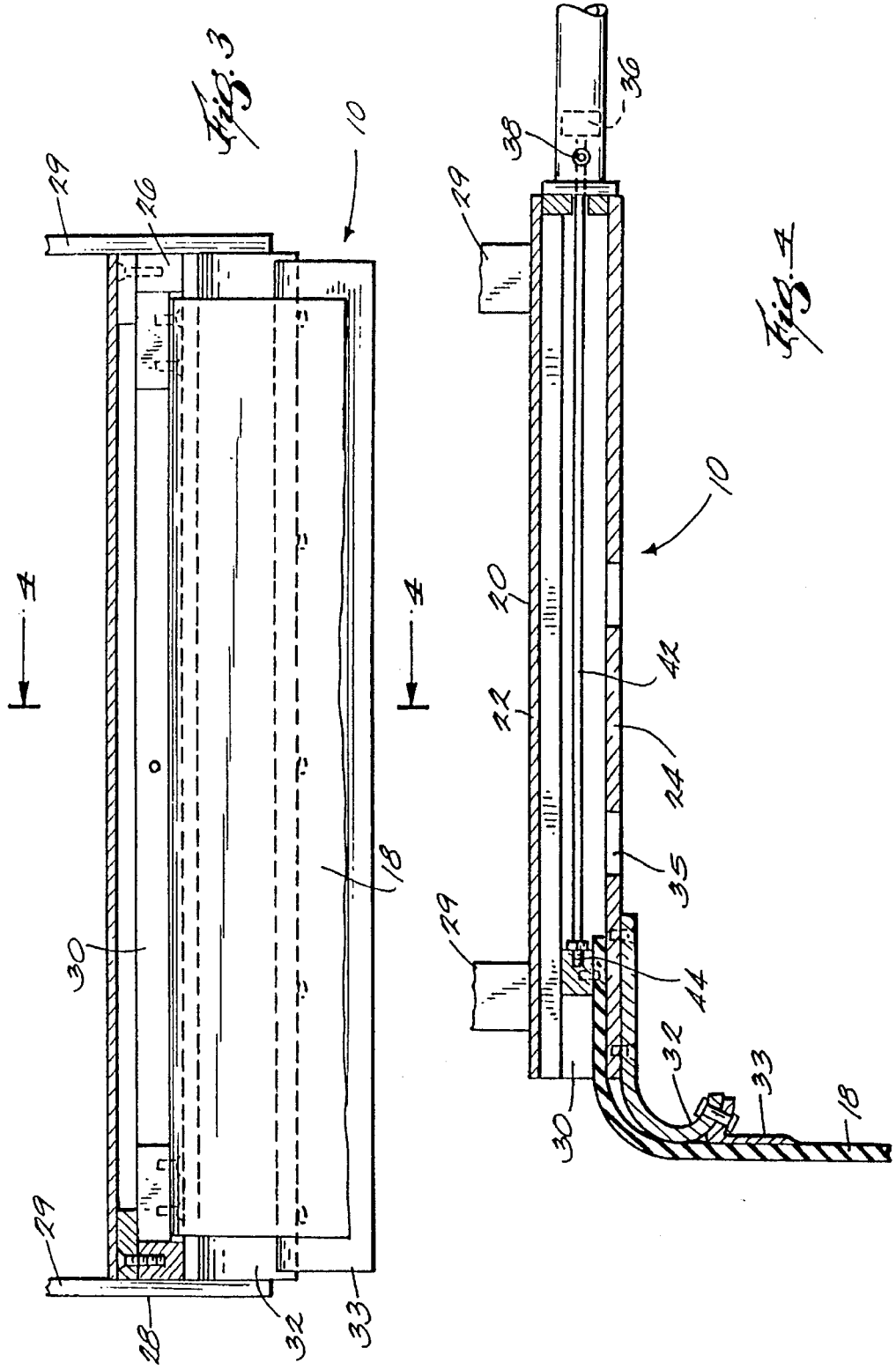

RETRACTABLE MUD FLAP

FIELD OF THE INVENTION

This invention relates to a retractable mud flap assembly for motor vehicles, especially dump trucks, and more particularly to such systems which are hydraulically or pneumatically actuatable.

BACKGROUND OF THE INVENTION

Large trucks such as dump trucks used in interstate commerce are required by law to be provided with mud flaps behind each set of rear wheels. Such flaps are required to protect other vehicles and persons from rocks and other debris from being rearwardly ejected from the truck wheels. Such flaps often can be torn from the rear of the vehicle when it is either backed into some object, or in the case of a dump truck, when the flap is buried by the load being deposited from the dump truck, the resultant lack of a proper mud flap on many vehicles, thus, gives rise to injuries and property damage.

Various flap retraction systems have been heretofore proposed. Many such systems, however, attempt to raise only the rear of the flap by folding the flap in half. Many of these systems require the use of complex and easily damaged actuating systems such as springs and cables. See, for example, U.S. Pat. Nos. 582,109; 3,248,126; and 3,905,616. The other system entails the provision of a removable mud flap suspended on a hanger. See, for example, U.S. Pat. No. 3,934,901. Such systems, however, require that the operator physically remove the mud flaps after leaving the truck cab. Another removable mud flap system is shown in U.S. Pat. No. 3,877,722.

Retractable mud flaps have also been proposed, however, such systems in the past have involved a series of springs and cables, all of which cause trouble for the operator and, thus, have not come into widespread usage. See U.S. Pat. Nos. 2,721,760 and 2,857,200.

SUMMARY OF THE INVENTION

A principal object of the invention is to provide an improved retractable mud flap system that provides an enhanced degree of protection for the mud flap when retracted. A further aspect of the invention is to provide such a retractable mud flap which can be retracted or extended under power as required from the cab of the truck.

In accordance with yet another aspect of the invention, the mud flap assembly includes a cavity or housing within which the mud flap is protectively contained when it is retracted. Another advantage of the mud assembly of the present invention is the elimination of springs and cables which were necessary for the functioning of previous devices.

Briefly, the invention provides a retractable mud flap assembly for a motor vehicle which includes an enclosure having a forward end and a rearward end and is of a generally flat profile that is open at its rearward end. A mud flap of a flat flexible shape is positioned for retraction into the enclosure and extension therefrom. A linear actuator, which is preferably a double acting hydraulically or pneumatically actuated cylinder, is attached to the mud flap and adapted to apply force thereto to extend and retract them. Preferably a downwardly curved lip extends from the lowermost rear surface of the enclosure.

Further objects and advantages of the invention will be apparent from the following detailed description, claims and accompanying drawings.

BRIEF DESCRIPTION OF THE DRAWINGS

FIG. 3 is a rear elevational view of the mud flap assembly shown in FIG. 1; and

FIG. 4 is a sectional view taken along line 4—4 of FIG. 3.

DETAILED DESCRIPTION OF A PREFERRED EMBODIMENT

Figure 1:
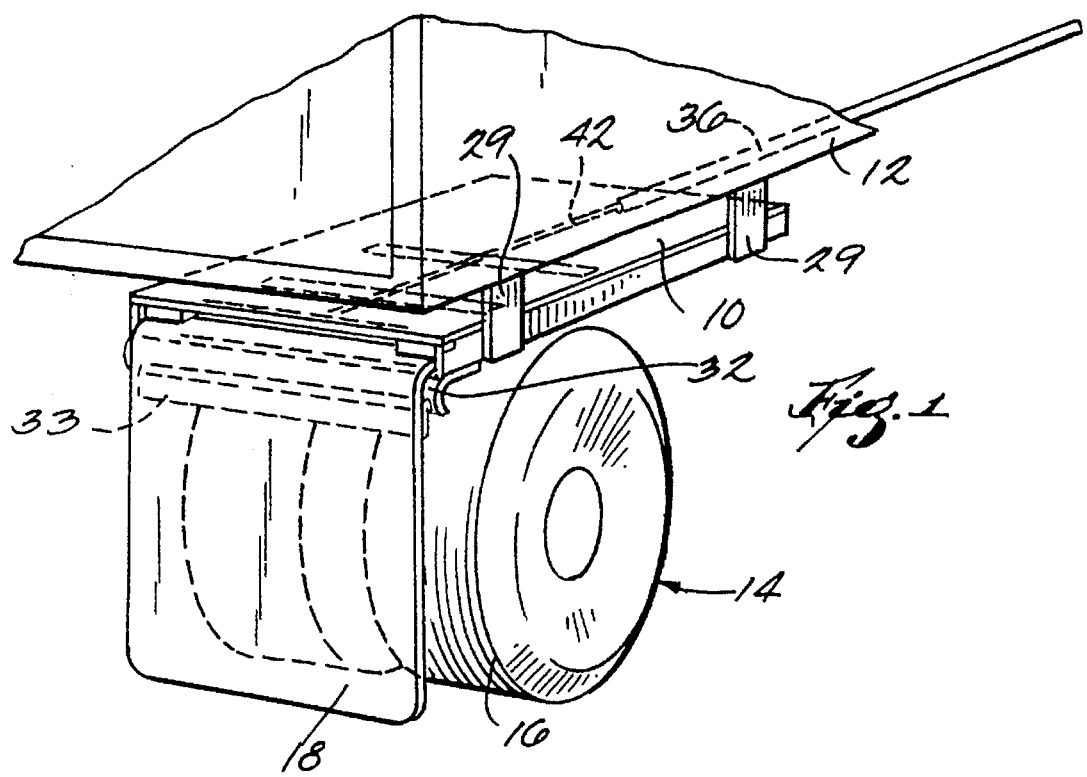
FIG. 1 is fragmentary perspective view of a portion of a truck on which a mud flap assembly of the present invention is mounted.
Figure 2:
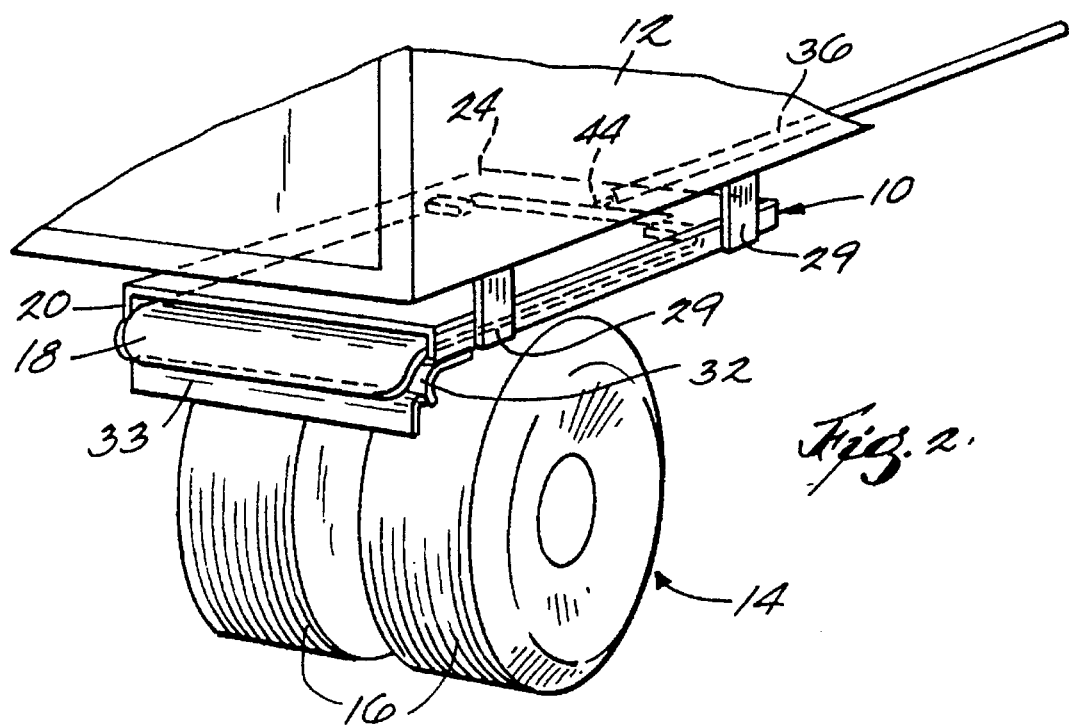
FIG. 2 is a perspective view of the assembly shown in FIG. 1 with the mud flap retracted.

Referring more particularly to the drawings, there is seen a retractable mud flap assembly 10 of this invention. Assembly 10 is mounted beneath cargo box 12 of a truck 14 which may be, for example, a dump truck. Assembly 10 is located above the rear wheels 16 of truck 14 in a location such that mud flap 18 will be suspended behind wheels 16 in an appropriate location to prevent debris from being thrown up by the wheels.

The illustrated retractable mud flap assembly of this invention includes an enclosure 20 having enclosed top, bottom and side walls 22, 24, 26 and 28, respectively. Enclosure 20 is open at its rearward end 30 to allow for retraction in extension of mud flap 18. Flaps 18 are formed from any conventional material of construction of such flaps, for example, of tough flexible rubber material. Preferably a curved lip 32 is provided along the lower edge of open end 30 to facilitate movement of flap 18. Enclosure 20 is supported on the bottom of truck bed 12 by a series of suitable brackets 29. The forward end 34 of enclosure 20 may be closed, as best seen in FIG. 4. However, the end 34 may be left partly open, thus providing an enclosure 20 in the form of a tunnel open on both ends.

A scraper 33 is preferably attached to lip 32, as shown, for example by means of rivets or other mechanical fasteners. Scraper 33 removes mud or debris from the surface of flap 18 as it is retracted. The bottom of enclosure 20 is preferably provided with a plurality of slots 35 which allow any debris that is pulled up into enclosure 20 to fall out.

Mud flap 18 is retracted and extended by means of a linear actuator, which is preferably a double acting cylinder 36. Cylinder 36 may be electrically, hydraulically or pneumatically actuated. In the case of a hydraulic cylinder, as shown, pair of ports 38 and 40 are provided in order to render cylinder 36 double acting, so that the flap 18 is positively extended as well as retracted under a controllable force. An actuatable rod 42 connects cylinder 36 to mud flap 18 to which it is attached by means of a suitable bracket 44. Preferably, forward end 34 of enclosure 20 is provided with a small opening through which rod 42 is fitted. Such opening serves as a guide for rod 42 during extension and retraction thereof.

A control lever or similar mechanism for actuating cylinder 36 can be mounted in the cab of a vehicle, or alternatively, if desired, exteriorally, for example on the cargo box of a truck. The linear actuator can also be configured so that the flaps are retracted whenever the vehicle is placed in reverse gear. Such an arrangement will ensure that the flaps retract in position when the truck is being backed up.

In accordance with a preferred embodiment of the invention, a double acting hydraulic ram cylinder operating at approximately 150 psi. is utilized by connection to the hydraulic system of a dump truck. The hydraulic system of the truck utilized for dumping a cargo box generally as operated at approximately 1800 psi. In accordance with the invention, a hydraulic line connected to a reducing valve is utilized. The reducing valve is used to reduce the hydraulic pressure from approximately 1800 psi. to 150 psi. A control system of conventional design can then be connected to the lower pressure system which is connected to the mud flaps as shown in order to enable retraction and extension by movement of a lever located within the cab of the truck.

The foregoing detailed description is considered to show an illustrative preferred embodiment demonstrating the principles of the invention. However, various modifications and adaptations will be apparent to those skilled in the art and, thus the scope of the invention should not be construed as being limited to the precise details shown. Thus, the scope of the invention should be deemed to be encompassed by the following claims and equivalents thereof.

What is claimed is:

1. A retractable mud flap assembly for a motor vehicle comprising:

an enclosure having top, bottom, and side walls, a forward end wall and a rearward end and a generally flat profile and being open at its rearward end, a mud flap of a flat flexible shape positioned for retraction through the open rearward end into said enclosure and extension therefrom, and a hydraulic cylinder attached to said mud flap and adapted to apply force thereto to extend and retract the same said hydraulic cylinder being located exteriorly of said enclosure and having a rearward end secured to said forward end wall, said hydraulic cylinder having an extendible rod extending through said forward end wall and connected to said mud flap, said hydraulic cylinder being connected to the hydraulic system of said motor vehicle by at least one hydraulic line, said cylinder being operable at approximately 150 psi, said motor vehicle hydraulic system operating at a substantially higher pressure of approximately 1800 psi, and a pressure reducer valve in said hydraulic line, and, a downwardly curved lip extending from a rearward edge of said bottom wall of said enclosure and a scraper connected to a lower edge of said lip, said scraper having a length substantially equal to the width of said mud flap and being positioned to remove mud from a forward facing surface of said flap as it is retracted into said enclosure.

2. A mud flap assembly according to claim 1 wherein said hydraulic cylinder comprises a double acting hydraulically or pneumatically actuated cylinder.

3. An assembly according to claim 1 wherein the bottom wall of said enclosure includes a plurality of slots which allow debris in the enclosure to fall out.

\* \* \* \* \*